United States Patent [19]
Hughes

[11] Patent Number: 5,535,068
[45] Date of Patent: Jul. 9, 1996

[54] HELICAL SCAN METHOD AND APPARATUS FOR ADJUSTING MEDIA SPEED TO READ NON-NATIVE FORMATS

[75] Inventor: Timothy C. Hughes, Boulder, Colo.

[73] Assignee: Exabyte Corporation, Boulder, Colo.

[21] Appl. No.: 180,485

[22] Filed: Jan. 12, 1994

Related U.S. Application Data

[63] Continuation-in-part of Ser. No. 74,671, Jun. 10, 1993, Pat. No. 5,349,481.

[51] Int. Cl.[6] .......................... G11B 15/46; G11B 15/48
[52] U.S. Cl. ...................................... 360/73.04; 360/74.5
[58] Field of Search .................. 360/48, 50, 54, 360/70, 77.13, 77.15, 73.04, 10.1, 10.3, 33.1, 27, 74.4, 74.5, 73.07, 72.3, 72.1, 722, 77.16, 77.17, 64

[56] References Cited

U.S. PATENT DOCUMENTS

| | | | |
|---|---|---|---|
| 4,125,881 | 11/1978 | Eige et al. | 360/50 |
| 4,215,377 | 7/1980 | Norris | 360/73.07 |
| 4,394,694 | 7/1983 | Ninomiya et al. | 360/73.02 X |
| 4,760,474 | 7/1988 | Takimoto | 360/64 |
| 4,835,628 | 5/1989 | Hinz et al. | 360/48 |
| 4,843,495 | 6/1989 | Georgis et al. | 360/77.15 |
| 5,003,411 | 3/1991 | Nagahara et al. | 360/72.2 |
| 5,065,261 | 11/1991 | Hughes et al. | 360/70 |
| 5,068,757 | 11/1991 | Hughes et al. | 360/77.13 |
| 5,115,500 | 5/1992 | Larsen | 395/425 |
| 5,142,422 | 8/1992 | Zook et al. | 360/54 |
| 5,191,491 | 3/1993 | Zweighaft | 360/77.13 |
| 5,327,305 | 7/1994 | Thomas | 360/74.5 |
| 5,349,481 | 9/1994 | Kauffman et al. | 360/74.4 |
| 5,414,570 | 5/1995 | Fry et al. | 360/48 |

*Primary Examiner*—Aristotelis Psitos
*Assistant Examiner*—Patrick Wamsley
*Attorney, Agent, or Firm*—Nixon & Vanderhye

[57] ABSTRACT

A helical scan system (10) determines whether a medium is a non-native formatted medium and controls operating parameters (e.g., tape speed) so that a non-native formatted medium can be read without resort to embedded servo information in the non-native medium. The helical scan system reads the medium in a manner to obtain format-indicative information therefrom, and then determines whether the medium is non-native formatted. If the medium is non-native formatted, a controller determines operating parameters required by the system to read the non-native formatted medium and generates signals corresponding to the required operating parameters. The medium is preferably read in a slow speed mode in order to obtain format-indicative information therefrom, and block header information obtained from the medium is analyzed to determine whether the medium is non-native formatted.

15 Claims, 7 Drawing Sheets

HELICAL SCAN METHOD AND APPARATUS FOR ADJUSTING MEDIA SPEED TO READ NON-NATIVE FORMATS

This application is a continuation-in-part application of U.S. patent application Ser. No. 08/074,671 filed Jun. 10, 1993, now U.S. Pat. No. 5,349,481.

BACKGROUND

1. Field of Invention

This invention pertains to helical scan recording and reproduction of information from a storage medium, and particularly concerns the reading of non-native formats by helical scan recorder.

2. Related Art and Other Considerations

Numerous prior art patents and publications teach recording and reading of information stored in helical stripes (or "tracks") on magnetic tape. Examples of helical scan tape drives are shown, inter alia, in the following U.S. patents (all of which are incorporated herein by reference):

U.S. Pat. No. 4,835,628 to Hinz et al.

U.S. Pat. No. 4,843,495 to Georgis et al.

U.S. Pat. No. 5,065,261 to Hughes et al.

U.S. Pat. No. 5,068,757 to Hughes et al.

U.S. Pat. No. 5,142,422 to Zook et al.

In a helical scan arrangement, travelling magnetic tape is at least partially wrapped around a rotating drum so that heads (both write heads and read heads) positioned on the drum are contiguous to the drum as the drum is rotated. One or more write heads on the drum physically record data on the tape in a series of discrete stripes oriented at an angle with respect to the direction of tape travel. The data are formatted, prior to recording on the tape, to provide sufficient referencing information to enable later recovery during readout by one or more read heads.

Some helical scan systems utilize a guardband format wherein all tracks are recorded at the same azimuthal angle and each track or stripe is separated from its neighbors by a gap or guardband. See, for example, U.S. Pat. No. 4,843,495 to Georgis et al.

Other helical scan systems are dual azimuthal in nature, with only alternating tracks having the same azimuthal angle and with no guardband between tracks. See, for example, U.S. Pat. No. 5,065,261 to Hughes et al. and U.S. Pat. No. 5,068,757 to Hughes et al. This is done so read operations allow the read heads to overlap slightly into adjacent tracks. The azimuths are selected so as to filter out unwanted adjacent track read noise. Since the tracks are written and read in pairs, the heads within a pair are mechanically separated by a distance corresponding to one track pitch. The width of the other track of a pair is determined by tape speed relative to scanner speed. This mechanical separation of the read heads prevents the heads from reading formats of different track pitches by the usual servo tracking means.

Moreover, track pitch varies from helical scan system to another. As used herein, track or stripe "pitch" means a distance between centerlines of two adjacent tracks, the centerlines of the tracks extending along the direction of head travel and the distances therebetween being taken perpendicularly to the centerlines. In a dual azimuth system, track pitch equates to the width of a track.

In the above regard, the format disclosed in the Exabyte Corporation EXB-8200 device which is the subject of U.S. Pat. No. 4,835,628 to Hinz et al. employed a track pitch of 31 microns. A subsequent Exabyte Corporation EXB-8500 device utilized a track pitch of 15.5 microns. More recently there has been proposed the use of a track pitch of 10.75 microns (see U.S. patent application Ser. No. 08/150,726 filed Nov. 12, 1993 of Georgis and Zweighaft entitled "Method And Apparatus For Controlling Linear Tape Speed In A Helical Scan Recorder" (incorporated herein by reference).

A very important requirement for new tape drives is to read tapes written by previous generation drives. This requirement can extend to several generations of old formats. Most typically, as illustrated above, new drives write and read narrower tracks, so the write and read heads become correspondingly smaller. Eventually the read heads (or servo heads) become small enough to where they are not capable of reading servo information from both sides of a track, making conventional servo techniques impossible. Reading servo information from just one side of the track is possible, but provides limited performance for tracking acquisition.

Furthermore, most combinations of old formats on new drives do not lend well to a servo technique since it is not desired to have the head pass over the same point on each track, for the result would be missing data in other sections of each track. What is needed is a system which has the requisite head traversals for efficiently reading old (e.g., non-native) formats on new drives.

SUMMARY

A helical scan system determines whether a medium is a non-native formatted medium and controls operating parameters (e.g., tape speed) so that a non-native formatted medium can be read without resort to embedded servo information in the non-native medium. The helical scan system reads the medium in a manner to obtain format-indicative information therefrom, and then determines whether the medium is non-native formatted. If the medium is non-native formatted, a controller determines operating parameters required by the system to read the non-native formatted medium and generates signals corresponding to the required operating parameters. The medium is preferably read in a slow speed mode in order to obtain format-indicative information therefrom, and block header information obtained from the medium is analyzed to determine whether the medium is non-native formatted.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

Figure 1:
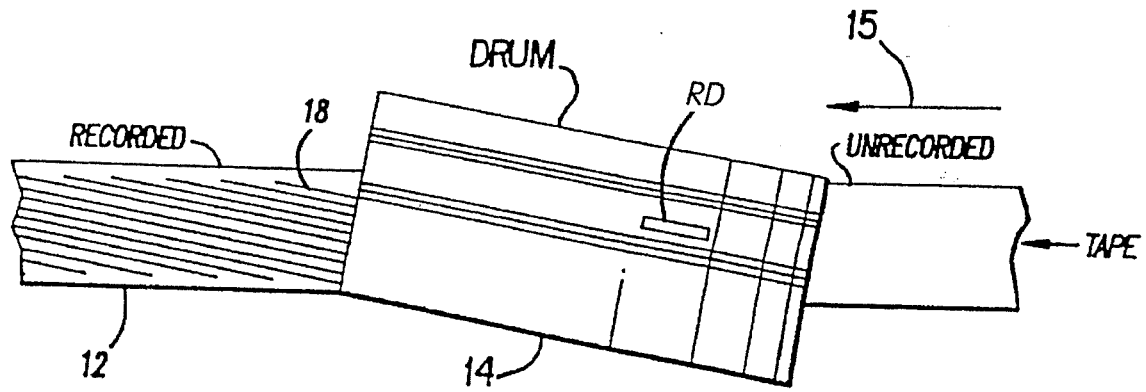
FIG. 1 is a schematic illustration of recording on magnetic tape by tracks using a helical scan recording arrangement.
Figure 2:
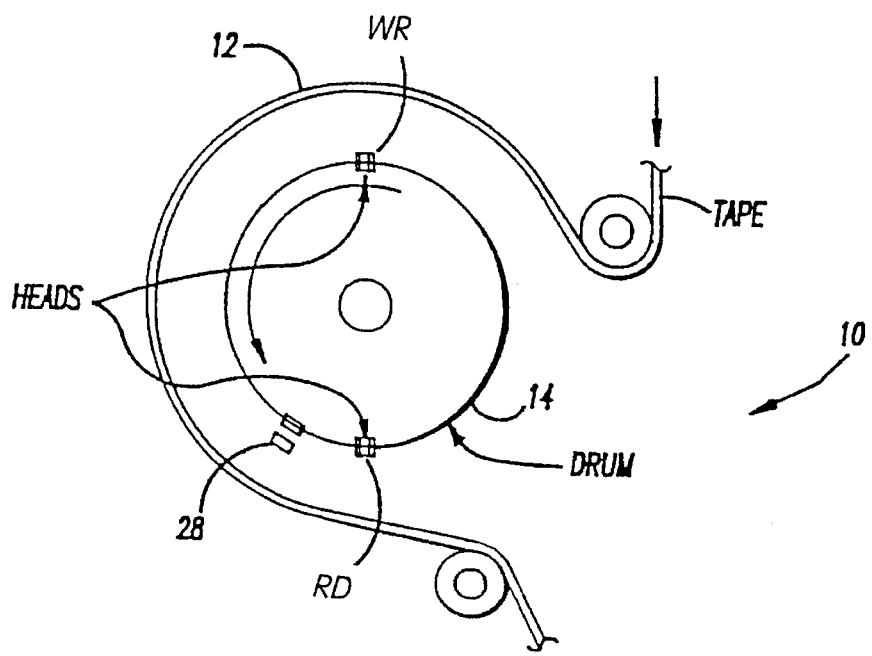
FIG. 2 is a schematic illustration of magnetic head placement on a rotatable drum for helical scan recording on magnetic tape according to an embodiment of the invention.

A helical-scan drive system 10 for recording on and reading magnetic tape 12 is illustrated in FIGS. 1 and 2. A drum 14 is angularly oriented with respect to the edges and direction of travel 15 of magnetic tape 12. As indicated in FIG. 2, drum 14 has heads RD and WR mounted thereon to establish a physical relation between the heads on the drum 14 and the tape 12. Head WR is a write (or recording head); head RD is a read (or playback) head.

By the illustrated arrangement, data are recorded on the tape 12 at an angle $\theta_{po}$ with respect to the direction of travel 15 of the tape 12, and hence, as indicated in FIG. 1, is recorded as discrete tracks or stripes 18 when the drum is rotated at a high speed relative to the speed of the tape 12. As indicated in FIG. 2, the tape is preferably moved at a predetermined nominal rate (for example, 10.89 millimeters per second in one embodiment) while the drum is rotated (for example, at 1800 rpm in one embodiment). For an embodiment including a capstan, tape speed can be controlled by the rotational speed of the capstan. It is to be realized, however, that the operating speeds as set forth are by way of example and the invention is not meant to be limited thereto.

Figure 3:
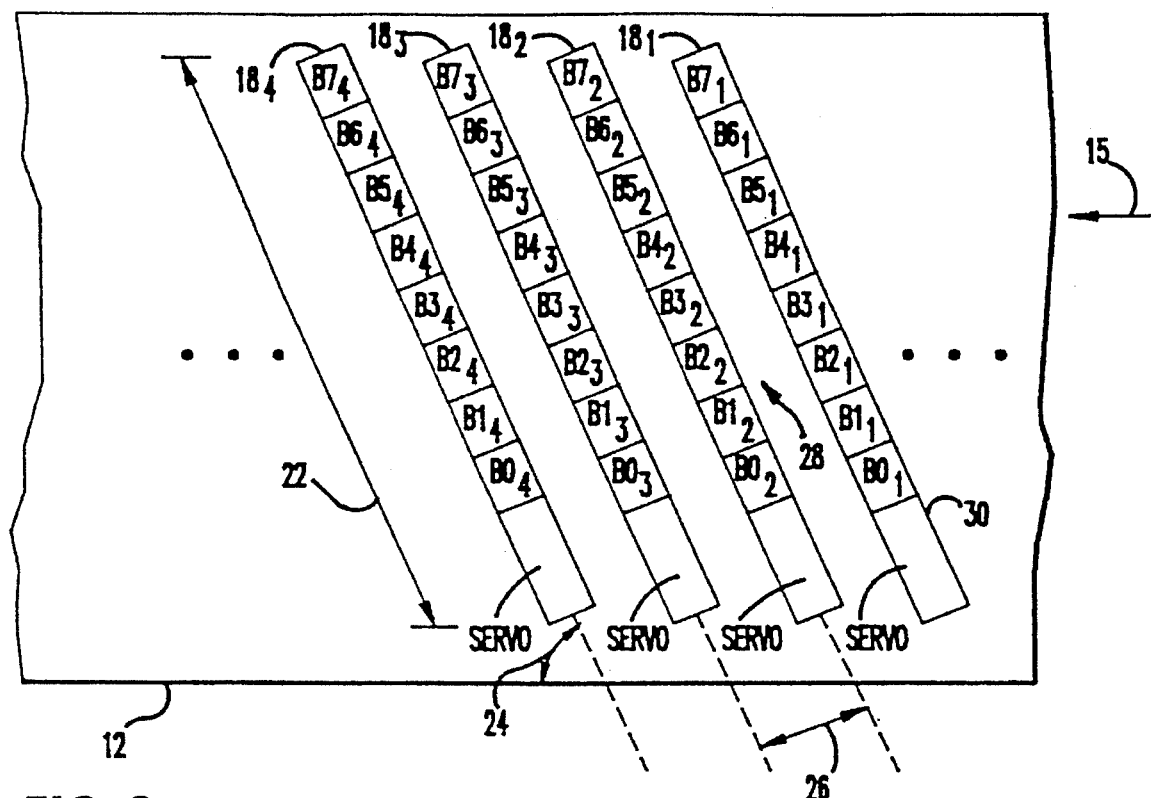
FIG. 3 ms a schematic illustration of helical tracks recorded on magnetic tape, and a particular format thereof.

FIG. 3 shows a plurality of discrete tracks $18_1$, $18_2$, $18_3$, and $18_4$ recorded on tape 15 according to one embodiment of the invention. Being properly recorded, each of the tracks 18 extends in a straight line for a predetermined length (depicted by line 22) at an angle $\theta_{PO}$ (also known as a "track angle" or "stripe angle") relative to the direction of tape travel (indicated by arrow 15). The centerlines of adjacent tracks are separated by a track pitch, represented by reference numeral 26 in FIG. 3 (and elsewhere herein as "TP").

In the illustrated embodiment, the tracks are separated by inter-track guard bands 28. In the illustrated embodiment, angle $\theta_{PO}$ is on the order of 4.9 degrees; the track pitch TP is on the order of 31 micrometers. It should be understood, however, that the present invention is also utilizable with track formats which do not employ intertrack guard bands, including a dual channel format disclosed in U.S. Pat. No. 5,142,422 to Zook et al. (incorporated herein by reference).

FIG. 3 also shows a format of tape 12 usable with the present invention. The tape 12 is block oriented, with eight data blocks $B0_x$, $B2_x$, ... $B7_x$ being provided per track 18, tracks x=1, 2, ... 4 being shown in FIG. 3 as previously stated. Each block is a complete and independent entity which can be read independently of any other data blocks. For an example of the format of each data block, see U.S. Pat. No. 4,835,628 to Hinz et al. entitled APPARATUS AND METHOD FOR FORMATTING AND RECORDING DIGITAL DATA ON MAGNETIC TAPE, which is commonly assigned herewith and incorporated by reference herein.

With regard to format, each data block contains certain header information, including a BLOCK ID and PHYSICAL BLOCK ID, the combination of which is unique for each block. As used hereinafter, "user data" and "user block" refer to the non-header portion of each block which is ultimately transmitted to a utilization device, such as a host computer.

In addition to containing the eight data blocks, in the illustrated embodiment each track 18 contains near its beginning (i.e., before the data blocks) a servo area 30. The servo area 30 has stored therein signals readable (either by head RD or by an unillustrated dedicated servo head) and usable for positioning the head RD on the drum 14 relative to the tape 12. In accordance with the illustrated servo scheme, the servo data in the servo area 30 are recorded only at the beginning of a track 18 and are sampled only once per revolution of the heads 16. Although FIG. 3 and various other drawings show the servo area 30 at the beginning of each track, it should be understood that the present invention is usable also with tracks having servo zones recorded at other locations, or even with tracks having no servo zones at all.

The helical-scan systems of the present invention advantageously read non-native formats. A "non-native format" as used herein means a format having tracks that deviate from any one or more of the following nominal, predetermined parameters of the drive or system reading the tape: track pitch; track angle; track length; and track straightness. As indicated above, this commonly occurs when reading older generation formats.

Figure 5:
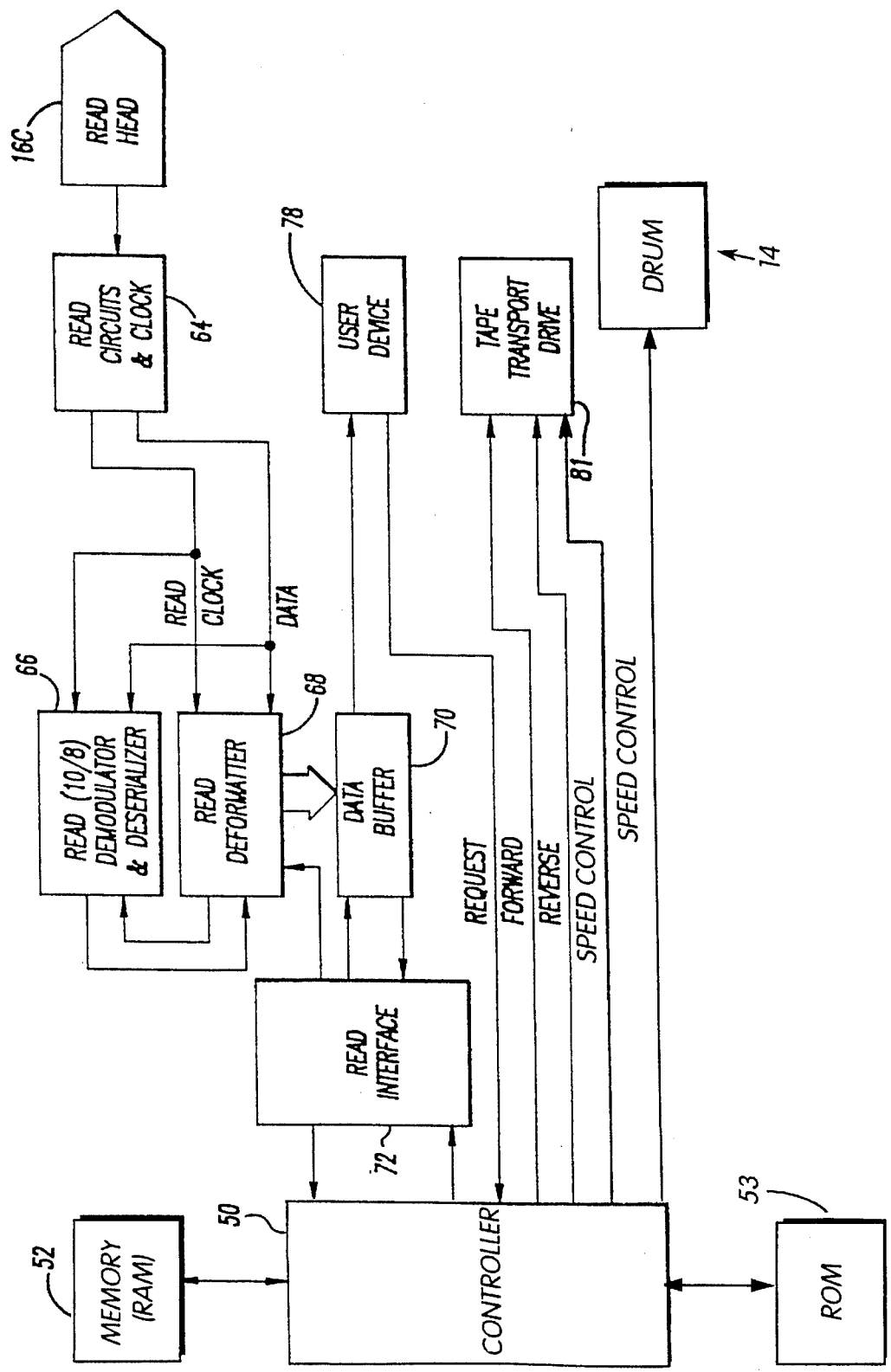
FIG. 5 is a schematic illustration of circuitry included in a helical scan drive system according to an embodiment of the invention.

In addition to the aforementioned elements, and as shown in FIG. 5, the helical drive system 10 of the invention further includes a controller 50, such as a micro-processor based micro-controller, for example. The controller 50 is connected to a bank of RAM memory 52 in conventional fashion. As will be seen hereinafter, an allocation table is stored in the RAM memory 52. The read head RD is connected to apply signals read from the tape 12 to read circuits & clock 64 (See FIG. 5). Data to be read are received at the read circuits 64 and, together with a clock signal, are coupled to a read demodulator and deserializer 66 and to a read deformatter 68. In the read deformatter 66, certain header and referencing signals are removed from the data stream so that the recovered user data can be applied in block form to a data buffer 70. The operations of the data buffer 70 and the read deformatter 68 are managed by a read interface 72, which in turn is governed by the controller 50. Details of the structure and operation of the circuitry of FIG. 5 are understood from U.S. Pat. No. 4,835,628, already incorporated by reference.

FIG. 5 additionally shows a user device 78 such as a host computer and an associated interface. The user device 78 is connected to request user data from the controller 50 and to receive user blocks from the data buffer 70.

Figure 6:
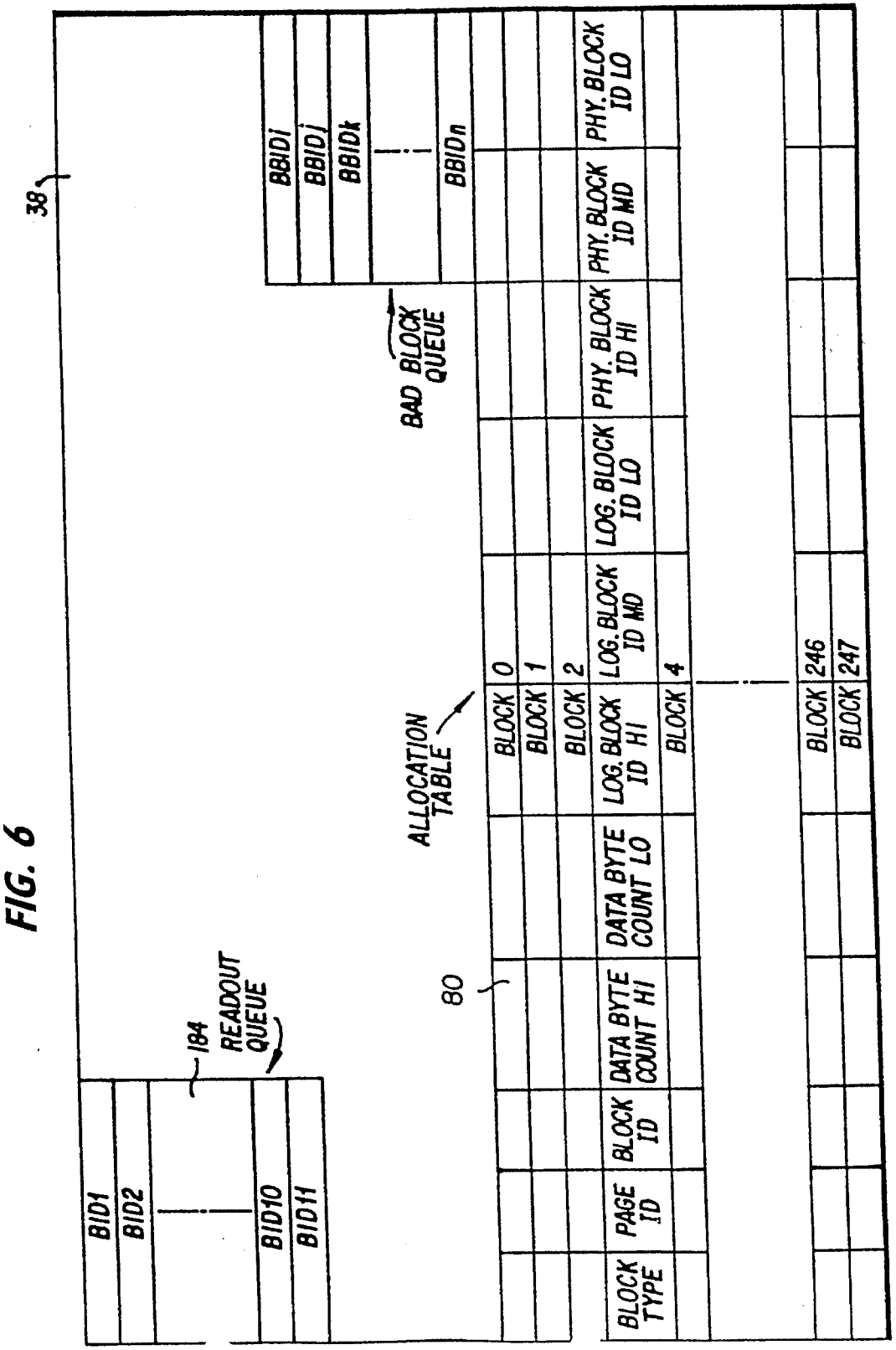
FIG. 6 is a schematic illustration depicting a portion of a controller memory including an allocation table according to an embodiment of the invention.

FIG. 6 schematically illustrates portions of the RAM memory 52 associated with the controller 50. The RAM memory 52 includes an allocation table 80. The allocation table 80 has stored therein certain parameters for as many as 248 or more blocks, shown as blocks 0–247 in FIG. 6. In FIG. 6, each block corresponds to a row of the allocation table 80. The parameters stored in the allocation table 80 for each block include block header information, including the BLOCK ID and PHYSICAL BLOCK ID parameters which are unique to each block.

Figure 7:
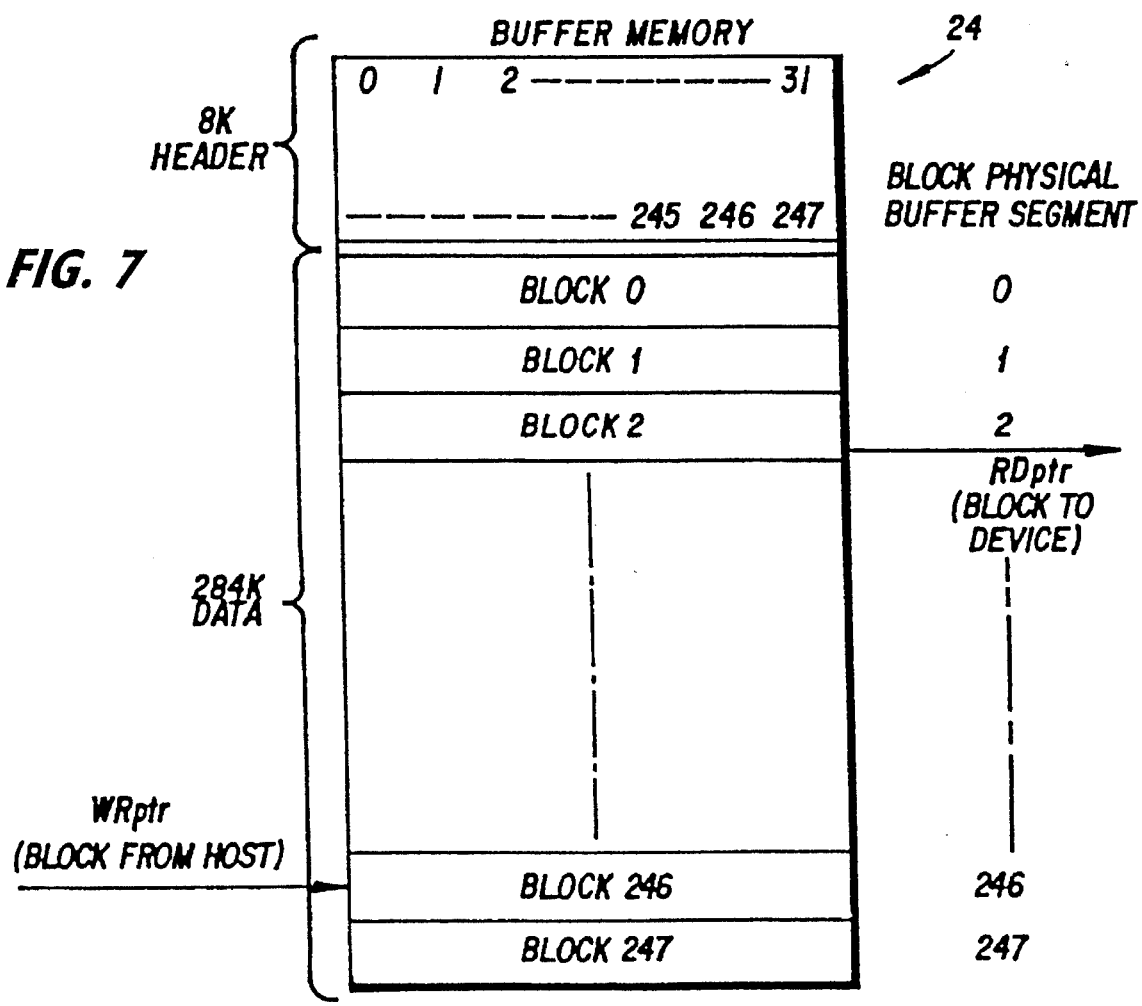
FIG. 7 is a schematic illustration depicting a memory organization scheme for a data buffer according to an embodiment of the invention.

FIG. 7 is a schematic view of the memory organization scheme of the data buffer 70. As shown in FIG. 7, the data buffer 70 includes 248K of memory for storing 248 blocks of user data, with each user block having a length of 1K. As will be seen hereinafter, when a user block of data is recognized by the read deformatter 68, the entire user block is transmitted to the data buffer 70 where the user block is stored at an appropriate address in the data buffer memory.

The controller 50 is connected to a tape transport drive 81 to direct the transport drive 81. The controller 50 provides both directional signals and a SPEED CONTROL signal to the transport drive 81. The directional signals include a FORWARD signal (for moving the tape in a forward direction [indicated by arrow 15]) and a REVERSE SIGNAL (e.g., for moving the tape in a reverse direction [opposite the direction indicated by arrow 15]). The transport drive actuates and controls the capstan 19, or other tape moving device such as that disclosed in simultaneously-filed U.S. patent application Ser. No. 8/150,730 of Robert J. Miles and James Zweighaft, filed Nov. 12, 1993 entitled "Capstanless Helical Drive System" (incorporated herein by reference).

In addition, controller 50 is also connected to a drum motor to control the speed of drum 14. Further, controller 50 is connected to access a read only memory (ROM) 53 in which format information is stored for a plurality of non-native formats.

OPERATION

Assume a tape of non-native format is inserted in helical-scan drive system 10. Assume further that the nonnative format tape was recorded as shown in FIG. 4 with tracks such as tracks T2 and T1, but that in its native operating mode head RD of system 10 travels the azimuthal paths denoted by $P1_1$, $P1_2$, etc.

Figure 4:
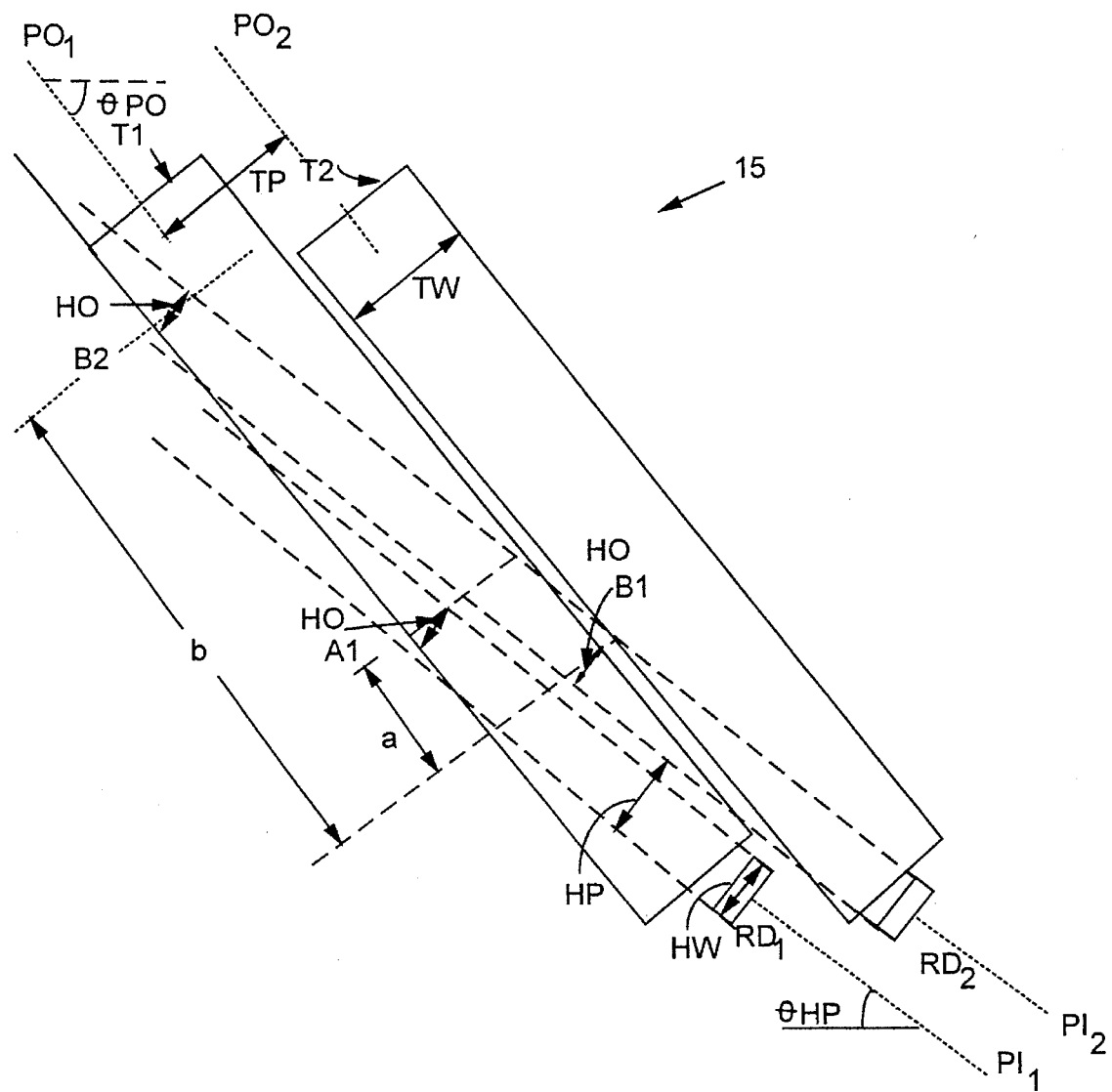
FIG. 4 is a schematic illustration of non-native formatted tracks being read by a helical scan recording system.
Figure 8:
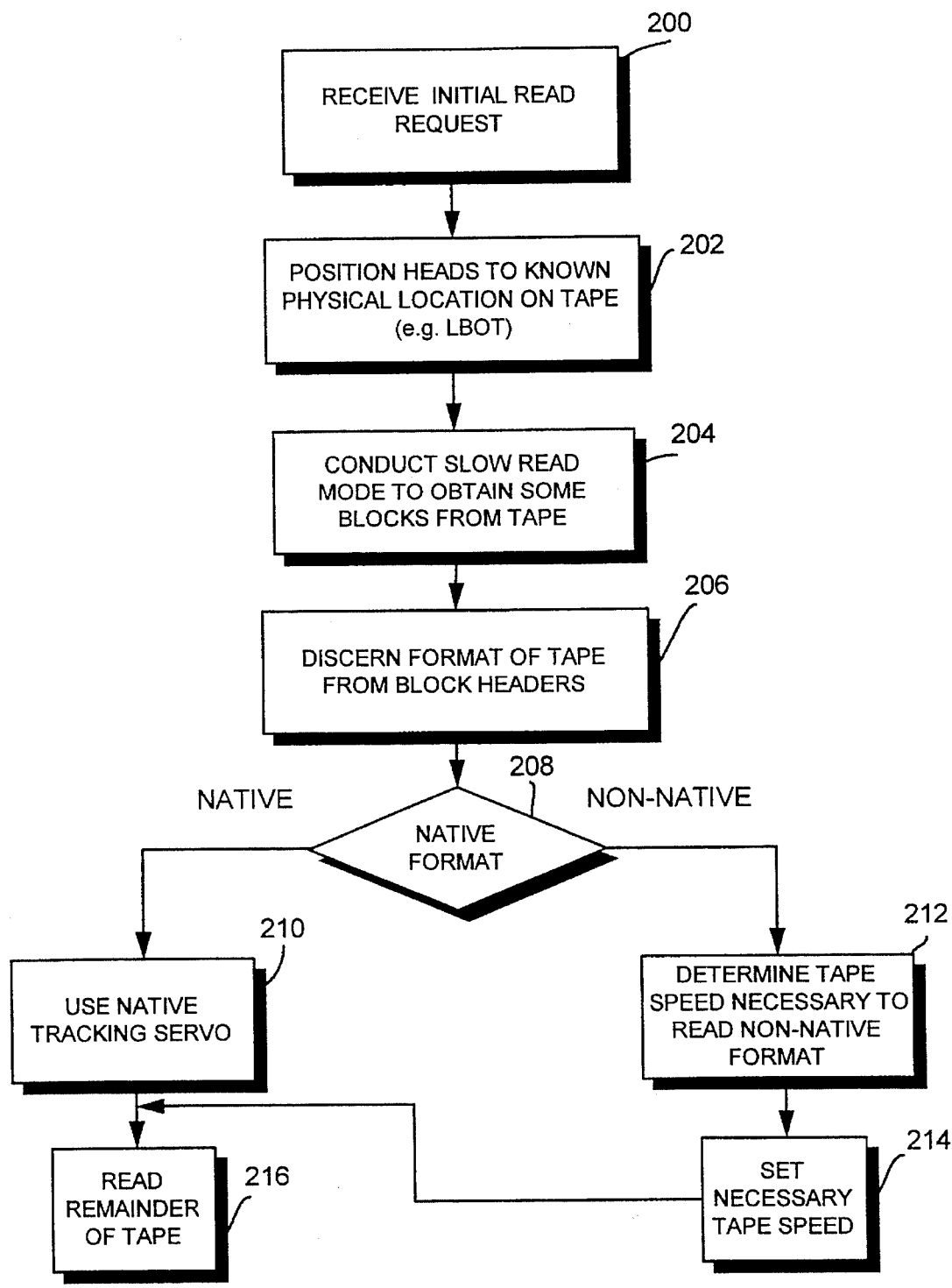
FIG. 8 is a flowchart illustrating steps executed in connection with reading of a tape, including a tape having a non-native format.

FIG. 8 shows steps executed by controller 50 in attempting to read the non-native formatted tape of FIG. 4. At step 200 system 10 receives (from an unillustrated host device) an initial request to read the tape of FIG. 4. Then, at step 202, controller 50 causes the tape to be positioned to a known physical position on the tape called LBOT (Logical Beginning of Tape).

At step 204 controller 50 causes the drive 10 to conduct a slow read mode in order to read at least some blocks from the tape. During the slow read mode, read head RD traverses modified azimuthal paths which are separated from one another by a distance less than the track pitch, thereby providing opportunities to read blocks which might otherwise not be read. Techniques for accomplishing the slow-read mode are understood from U.S. patent application Ser. No. 08/074,671, now U.S. Pat. No. 5,439,481, filed Jun. 10, 1993, by Kauffman et al. and entitled "Apparatus and Method For Distorted Track Data Recovery", now U.S. Pat. No. 5,349,481, which is incorporated herein by reference.

At step 206 controller 50 analyzes headers from blocks obtained at step 204, and from those headers determines the particular format of the tape which drive 10 is attempting to read. In so doing, the read data clock may need to be adjusted through all known formats for making the identification of format type.

Having established the tape format at step 206, at step 208 controller 50 determines whether the tape format type is the native format to which system 10 is accustomed. If, as a result of the determination at step 208, the format is the native format, execution jumps to step 210 and the normal tracking servo is used in the conventional or native sense of drive 10.

If the format is not native, but recognized at step 206 as a legitimate format which drive 10 supports, the "other format" or "non-native" decision route is taken to step 212.

At step 212 controller 50, accessing ROM 53 and preforming the calculations hereinafter described, determines the tape speed Vd necessary for drive 10 to read the non-native tape (e.g., the tape of FIG. 4). Then, at step 214, controller 50 outputs SPEED_CONTROL signals to tape transport drive 81 so that the tape is transported at the required speed for reading the non-native format. Thereafter, at step 216, the tape is read without resort to conventional embedded servo information.

Reference is again made to FIG. 4 as a predicate for an understanding of how controller 50 makes the determinations of step 212. The following nomenclature is derived from FIG. 4:

TP=Track pitch of tape format

TW=Track width of tape format

T1=A written track

T2=the next written track

PO=Original azimuthal paths when written $\theta_{PO}$=Original track angle

P1=head traversal paths of tape drive reading this format $\theta_{HP}$=Angle to head traversal paths over tape RD=Read head (showing pass 1 and 2)

HW=Read head width

HP=Read head traversal path pitch

HO=Read head overlap of desired data required to get enough signal to read the data. Typical is 0.6 to 0.8 times the HW. Note that it must also be such that the nonoverlapping section (HW−HO) does not extend into a like azimuth track. For example, if head RD2 was at position $HO_{B1}$, it could not read T1 if part of the head still overlapped into T2.

$HO_{A1}$=position where head RD on pass $P1_1$ ceases to overlap into T1 by more than HO.

$HO_{B1}$=position where head RD on pass $P1_2$ begins overlapping track T1 by more than HO.

$HO_{B2}$=position where head RD on pass $P1_2$ ceases to overlap into T1 by more than HO.

a=Distance along PO (T1 shown) between $HO_{B1}$ and $HO_{A1}$ b=Distance along PO (T1 shown) between $HO_{B1}$ and $HO_{B2}$ It is assumed that the transfer rate during reading will be maintained equal to or greater than original transfer rate when written. It is further assumed that the clock rate is adjusted to support a drum speed DR in the reading drive. Such being the case, data transfer rate is a function of DR.

At step 212, controller 50 executes various substeps beginning with substep 212-1.

Substep 212-1

At substep 212-1, controller 50 sets $$DR*HP \geq HO*TP \qquad \text{[Equation 1]}$$

where DO=Original (writing) deck drum speed. This sets the transfer rate of the new drive reading the old format ≧ to the transfer rate of the original drive. It is generally convenient to set the drum speed at the same value as that required for the drive's native format, which is typically higher than that used in the old format.

Substep 212-2

To guarantee enough coverage of the old format by the new drive head traversals, the two equations of substep 212-2 must be satisfied:

Set: $a \geq$ Block Length of old format  [Eqn. 2]

Verify: $b \geq 2^*$ Block Length of old format  [Eqn. 3]

These equations guarantee that if a given head traversal misses a given block, the next traversal will have enough overlap (coverage) to read it.

Substep 212-3

From FIG. 4, it can be seen that the desired HP is defined as:

$$HP = TW - HO + (HW - HO) - a^* \sin(\theta_{PO} - \theta_{HP}) \quad \text{[Eqn. 4]}$$

Substep 212-4

The following two equations are defined by helical scan geometries:

$$\tan(\theta_{HP}) = (\pi^* D^* Vd^* \sin(\theta_{PO}))/(\pi^* D^* Vd^* \cos(\theta_{PO}) - VT) \quad \text{[Eqn. 5]}$$

where
D—drum diameter
Vd—Drum velocity
Vt=tape velocity $$HP = (Vt/Vd)^* \sin(\theta_{HP}) \quad \text{[Eqn. 6]}$$

Substep 212-5

Equations 4, 5, and 6 thus define three equations in three unknowns, particularly the unknowns HP, $\theta_{HP}$, and Vt. The other terms of Equations 4, 5, and 6 are unknowns and are stored in ROM 53 (assuming Vd was set by the drive requirements). Thus, HP, $\theta_{HP}$, and Vt can be solved with these three equations.

Substep 212-6

The results of substep 212-5 must then be compared against the requirements of Equation 3. The distance b is defined as:

$$b = (TW/\sin(\theta_{PO} - \theta_{HP})) - (2^* HO - HW)^* \cos(\theta_{PO} - \theta_{HP}) \quad \text{[Eqn. 7]}$$

Substep 212-7

After having verified that b satisfied Equation 3, the tape speed is thus defined to provide the HP and $\theta_{HP}$ required to adequately cover the old format with the new read heads, using no embedded servo information at all. Moreover, it should be mentioned that the resulting drum speed and HP can be used in equation 1 to compare the resultant data transfer rate to that of the original writing drive.

Thus, the present invention provides the ability to read virtually any format, including old generation formats, formats at a data rate equivalent to the original (writing) drive, formats of larger track pitch, formats of different track pitch read on a drive with dual read heads separated by a fixed mechanical offset (TP not=RD head offset), formats on a drive which cannot or does not read the original servo data, formats of larger track pitch read on a drive with dual read heads separated by a fixed mechanical offset, formats of larger track pitch read on a drive with dual read heads separated by a fixed mechanical offset smaller than the track pitch to be read, formats of larger track pitch read on a drive with dual read heads separated by a fixed mechanical offset smaller than the track pitch to be read at a data rate equivalent to the original (writing) drive.

Thus, the present invention defines the head traversals needed for efficiently reading old formats on new drives.

While the invention has been particularly shown and described with reference to the preferred embodiments thereof, it will be understood by those skilled in the art that various alterations in form and detail may be made therein without departing from the spirit and scope of the invention. For example, although discussed herein in the context of a guardband-type system, the principles of the invention are equally applicable to a dual azimuth system.

The embodiments of the invention in which an exclusive property or privilege is claimed are defined as follows:

1. A helical scan system which reads information recorded in helical stripes on a storage medium, the system comprising:

a medium transport which transports the storage medium along a transport path;

a rotating drum positioned proximate the transport path;

a read head mounted on the drum for obtaining information signals from the medium transported past the drum;

a controller which, in response to signals read by the read head, determines whether the medium is of a non-native track format for the system and which generates a signal to the medium transport so that the medium is transported at a speed at which the medium is read without resort to embedded servo information in the medium;

the non-native format being a format having tracks that deviate from at least one of the following nominal, predetermined parameters of the system reading the tape: track pitch, track angle, track length, and track straightness.

2. A method of operating a helical scan system which reads information recorded in helical stripes on a storage medium, the method comprising:

reading the medium in a manner to obtain format-indicative information therefrom;

determining whether the medium is non-native track formatted, non-native track formatted being a format having tracks that deviate from at least one of the following nominal, predetermined parameters of the system reading the tape: track pitch track angle, track length, and track straightness;

if the track is determined to be non-native formatted, determining an operating parameter required by the system to read the medium;

generating signals corresponding to the required operating parameters for use by the system whereby the medium is read without resort to embedded servo information in the medium.

3. The method of claim 2, wherein the medium is read in a slow speed mode in order to obtain format-indicative information therefrom.

4. The method of claim 2, wherein block header information obtained from the medium is used to determine whether the medium is non-native track formatted.

5. The method of claim 2, wherein the required operating parameter is tape speed along the transport path.

6. A helical scan system which reads information recorded in helical stripes on a storage medium, the system comprising:

a medium transport which transports the storage medium along a transport path;

a rotating drum positioned proximate the transport path;

a read head mounted on the drum for obtaining information signals from the medium transported past the drum;

a memory which has stored therein format information for a non-native track format;

a controller which, in response to signals on the medium read by the read head, determines whether the medium is of the non-native track format for the system and which, in response to a determination that the medium is of the non-native track format, obtains and uses the format information from the memory to generate a signal to the medium transport whereby the medium is transported at a speed at which the medium can be read;

the non-native format being a format having tracks that deviate from at least one of the following nominal, predetermined parameters of the system reading the tape: track pitch, track angle, tracklength, and track straightness.

7. The helical scan system of claim 6, wherein the memory has stored therein format information for a plurality of non-native track formats.

8. The helical scan system of claim 6, wherein the controller generates a signal indicative of medium transport speed Vt by simultaneously solving the following equations:

$$HP=TW-HO+(HW-HO)-a*\sin(\theta_{PO}-\theta_{HP})$$

$$\tan(\theta_{HP})=(\pi*D*Vd*\sin(\theta_{PO}))/(\pi*D*Vd*\cos(\theta_{PO})-Vt)$$

$$HP=(Vt/Vd)*\sin(\theta_{HP})$$

in which:

TP=Track pitch of non-native track format

TW=Track width of non-native track format $\theta_{PO}$=Non-native track angle $\theta_{HP}$=Angle of traversal paths of the read head over the medium HP=Traversal path pitch of the read head HO=Read head overlap Vd=drum velocity HW=read head width D=drum diameter a is equal to or greater than a block length of the non-native track format.

9. A method of operating a helical scan system which reads information recorded in helical stripes on a storage medium, the method comprising:

(1) transporting the medium past a read head to read headers from at least some blocks recorded on the medium;

(2) using information from the headers read in step (1) to determine if the format of the medium is a non-native track format for the helical scan system and, if the format of the medium is a non-native track format for the helical scan system, the non-native format being a format having tracks that deviate from at least one of the following nominal predetermined parameters of the system reading the tape: track pitch, track angle, track length, and track straightness; then (3) determining a medium speed suitable for reading the non-native track format without resort to embedded servo information in the medium; and (4) transporting the medium past the head at the speed determined in step (3).

10. The method of claim 9, wherein the medium is transported past the read head in step (3) at a slow speed.

11. The method of claim 9, further comprising obtaining from a memory format information for the non-native track format and using the format information in connection with the determination of step (3).

12. The method of claim 9, wherein the medium speed VD for reading the non-native track format is determined by simultaneously solving the following equations:

$$HP=TW-HO+(HW-HO)-a*\sin(\theta_{PO}-\theta_{HP})$$

$$\tan(\theta_{HP})=(\pi*D*Vd*\sin(\theta_{PO}))/(\pi*D*Vd*\cos(\theta_{PO})-Vt)$$

$$HP=(Vt/Vd)*\sin(\theta_{HP})$$

in which:

TP=Track pitch of non-native track format

TW=Track width of non-native track format $\theta_{PO}$=Non-native track angle $\theta_{HP}$=Angle of traversal paths of the read head over the medium HP=Traversal path pitch of the read head HO=Read head overlap Vd=drum velocity HW=read head width D=drum diameter a is equal to or greater than a block length of the non-native track format.

13. A method of operating a helical scan system which reads information recorded in helical stripes on a storage medium, the method comprising:

(1) transporting the medium past a read head to read at least some blocks recorded on the medium;

(2) using the blocks read in step (1) to determine if the format of the medium is a non-native track format for the helical scan system and, if the format of the medium is a non-native track format for the helical scan system, the non-native format being a format having tracks that deviate from at least one of the following nominal, predetermined parameters of the system reading the tape: track pitch, track angle, track length, and track straightness; then (3) accessing a memory to obtain format information for the non-native track format;

(4) using the format information obtained at step (3) to determine a medium speed for reading the non-native track format without resort to embedded servo information in the medium; and (5) transporting the medium past the head at the speed determined in step (4).

14. The method of claim 13, wherein the medium is transported past the read head in step (a) at a slow speed.

15. The method of claim 13, wherein the medium speed VD for reading the non-native track format is determined by simultaneously solving the following equations:

$$HP=TW-HO+(HW-HO)-a*\sin(\theta_{PO}-\theta_{HP})$$

$$\tan(\theta_{HP})=(\pi*D*Vd*\sin(\theta_{PO}))/(\pi*D*Vd*\cos(\theta_{PO})-Vt)$$

$$HP=(Vt/Vd)*\sin(\theta_{HP})$$

in which:

TP=Track pitch of non-native track format

TW=Track width of non-native track format $\theta_{PO}$=Non-native track angle $\theta_{HP}$=Angle of traversal paths of the read head over the medium HP=Traversal path pitch of the read head HO=Read head overlap Vd=drum velocity HW=read head width D=drum diameter a is equal to or greater than a block length of the non-native track format.

* * * * *